(12) United States Patent
Hazeltine et al.

(10) Patent No.: US 9,162,898 B2
(45) Date of Patent: Oct. 20, 2015

(54) PURIFICATION OF TRICHLOROSILANE

(71) Applicant: GTAT Corporation, Merrimack, NH (US)

(72) Inventors: Bruce Hazeltine, Missoula, MT (US); Scott Fahrenbruck, Missoula, MT (US); Wenjun Qin, Missoula, MT (US)

(73) Assignee: GTAT Corporation, Merrimack, NH (US)

( * ) Notice: Subject to any disclaimer, the term of this patent is extended or adjusted under 35 U.S.C. 154(b) by 183 days.

(21) Appl. No.: 13/667,277

(22) Filed: Nov. 2, 2012

(65) Prior Publication Data

US 2013/0121907 A1    May 16, 2013

Related U.S. Application Data

(60) Provisional application No. 61/554,712, filed on Nov. 2, 2011.

(51) Int. Cl.
*C01B 33/107*    (2006.01)
*B01D 3/14*    (2006.01)

(52) U.S. Cl.
CPC .......... *C01B 33/10778* (2013.01); *B01D 3/143* (2013.01)

(58) Field of Classification Search
CPC ................................. C01B 33/10778
USPC ................................. 423/341, 342
See application file for complete search history.

(56) References Cited

U.S. PATENT DOCUMENTS 4,713,230 A    12/1987    Doornbos
2010/0320072 A1 *    12/2010    Schwarz et al. ............... 203/81

FOREIGN PATENT DOCUMENTS

| DE | 102008002537 A1 | 12/2009 |
| EP | 2471740 A1 | 7/2012 |
| WO | WO 2008113619 A3 * | 9/2008 |

OTHER PUBLICATIONS

International Search Report and Written Opinion for International Application No. PCT/US2012/063209, Mailed Oct. 28, 2013, 11 pages.

* cited by examiner

*Primary Examiner* — Matthew E Hoban
*Assistant Examiner* — James Fiorito
(74) *Attorney, Agent, or Firm* — Maine Cernota & Rardin

(57) ABSTRACT

Systems and methods for removing boron-containing contaminants from a composition comprising trichlorosilane to form a purified product comprising trichlorosilane are disclosed. Purification columns and devices, having various locations of inlet and outlet ports, are fluidly connected to each other in order to remove various types of boron species and other impurities present in TCS.

11 Claims, 2 Drawing Sheets

PURIFICATION OF TRICHLOROSILANE

CROSS-REFERENCE TO RELATED APPLICATION

This patent application claims the benefit of U.S. Provisional Patent Application No. 61/554,712, filed on Nov. 2, 2011, the disclosure of which is hereby incorporated by reference herein in its entirety.

TECHNICAL FIELD

The present invention relates to systems and methods for removing contaminants from trichlorosilane-containing compositions.

BACKGROUND

Halosilanes, such as trichlorosilane (TCS), are used in the manufacture of polycrystalline silicon. TCS can be prepared by a number of different processes, including hydrochlorination in which silicon tetrachloride (STC) is reacted with metallurgical grade silicon and hydrogen, often in a fluidized bed reactor, and the resulting crude TCS is subsequently purified prior to being fed into a CVD reactor in which the polysilicon is formed by deposition onto heated silicon filaments. The properties of the polysilicon produced depend, to a large extent, on the purity of the TCS used. In order to meet the stringent demands of the solar and semiconductor industries, it is critical to provide starting materials, including TCS, having extremely low levels of impurities.

Impurities in TCS can arise from a variety of different sources, including, for example, the metallurgical grade silicon from which it was prepared. This silicon is known to contain various metal species such as aluminum, iron, copper, phosphorus, and boron. Of these, boron-containing species have been found to be particularly difficult to remove from TCS. For example, boron-containing impurities typically have very similar boiling points as TCS, making separation of these contaminants extremely difficult and inefficient to accomplish by distillation. Furthermore, once the boron species have become entrained in the resulting polysilicon, it is also very difficult to remove. For example, boron-containing species partition nearly equally between a silicon melt phase and a solid phase, making it extremely difficult to remove by common re-solidification processes such as directional solidification. In addition, the presence of boron compounds provides an unwanted doping of the polysilicon properties, such that p-type semiconductors are obtained.

For this reason, various processes have been described for removal of boron-containing impurities from TCS. For example, it has been shown that boron species can be removed from TCS, either in the liquid phase or the gaseous phase, using an adsorbant such as silica gel. However, for such processes, the loading capacity of the adsorbant is often rapidly exceeded, and, as a result, an excessive quantity of adsorbant would be needed, making this approach uneconomical. In addition, it has been shown that water (such as from a moist inert gas) or other hydroxyl-containing species can be added to TCS to convert the boron-containing impurities, believed in the art to be primarily $BCl_3$, into compounds that can be subsequently removed, such as by distillation. However, in such a process, an excess of hydroxyl-group reagent compared to the boron impurity is needed in order to fully remove the contaminants, and, under these conditions, TCS can also react, leading to unwanted side reactions and formation of silica and other polymeric siloxanes, which would require additional methods of removal.

Thus, while methods are known in the art, there is a need in the industry for improved methods and systems that are capable of efficiently and effectively removing contaminants, particularly boron-containing contaminants, from compositions containing trichlorosilane.

SUMMARY OF THE INVENTION

The present invention relates to a method of removing at least one boron-containing contaminant from a composition comprising trichlorosilane to form a purified product comprising trichlorosilane. In one embodiment, the method comprises the steps of i) partially removing the boron-containing contaminant from the composition to form a partially purified composition comprising trichlorosilane, and ii) feeding the partially purified composition into a purification column through a side inlet port and removing from the purification column a) a top boron-containing contaminant stream through a top outlet port, b) a bottom boron-containing contaminant stream through a bottom outlet port, and c) a purified composition comprising trichlorosilane through a side outlet port. For this embodiment, the side outlet port of the purification column can be above the side inlet port of the purification column. Alternatively, the side outlet port of the purification column can be below the side inlet port of the purification column. Additional purification devices may also be used. In a second embodiment, the method of the present invention comprises the steps of i) feeding the composition into a first column through an upper inlet port and removing from the first column a) a first top boron-containing contaminant stream through a top outlet port, and b) a first partially purified composition comprising trichlorosilane through a bottom outlet port; and ii) passing the first partially purified composition through at least one additional purification device to form the purified product.

In a specific embodiment, the method of the present invention comprises the steps of i) feeding the composition into a first column through an upper inlet port and removing from the first column a) a first top boron-containing contaminant stream through a top outlet port, and b) a first partially purified composition comprising trichlorosilane through a bottom outlet port; ii) feeding the first partially purified composition into a second column through a side inlet port and removing from the second column a) a second top boron-containing contaminant stream through a top outlet port, b) a second bottom boron-containing contaminant stream through a bottom outlet port, and c) a second partially purified composition comprising trichlorosilane through a side outlet port; iii) feeding the second purified composition into a third column through a side inlet port and removing from the third column a) a third top boron-containing contaminant stream through a top outlet port, b) a third bottom boron-containing contaminant stream through a bottom outlet port, and c) a third partially purified composition comprising trichlorosilane through a side outlet port; iv) treating the third purified composition with at least one metal oxide in a treatment vessel to form a treated composition and removing a treatment contaminant stream; and v) feeding the treated composition into a fourth column through a side inlet port and removing from the fourth column a) a fourth top boron-containing contaminant stream through a top outlet port, b) a fourth bottom boron-containing contaminant stream through a bottom outlet port, and c) the purified product comprising trichlorosilane through a side outlet port. Preferably, for this specific embodiment, the side outlet port of the second column is above the side inlet port of the second column, the side outlet port of the third column is below the side inlet port of the third column, and the side outlet port of the fourth column is above the side inlet port of the fourth column.

The present invention further relates to a system for removing at least one boron-containing contaminant from a composition comprising trichlorosilane to form a purified product comprising trichlorosilane. In a first embodiment, the system comprises a) at least one purification device having an inlet port to receive the composition and an outlet port to remove a partially purified composition comprising trichlorosilane; and b) a purification column having a side inlet port to receive the partially purified composition, a top outlet port and a bottom outlet port to remove a boron-containing contaminant stream, and a side outlet port to remove a purified composition comprising trichlorosilane, wherein the side inlet port of the purification column is fluidly connected to the outlet port of the purification device. In a second embodiment, the system comprises a) a first column having an upper inlet port to receive the composition, a top outlet port to remove a boron-containing contaminant stream, and a bottom outlet port to remove a first partially purified composition comprising trichlorosilane; and b) at least one purification device having an inlet port to receive the first partially purified composition and an outlet port to remove a purified composition comprising trichlorosilane, wherein the inlet port of the purification device is fluidly connected to the bottom outlet port of the first column.

In a specific embodiment, the system of the present invention comprises a) a first column having an upper inlet port to receive the composition, a top outlet port to remove a first top boron-containing contaminant stream, and a bottom outlet port to remove a first partially purified composition comprising trichlorosilane; b) a second column having a side inlet port fluidly connected to the bottom outlet port of the first column to receive the first partially purified composition, a top outlet port to remove a second top boron-containing contaminant stream, a bottom outlet port to remove a second bottom boron-containing contaminant stream, and a side outlet port to remove a second partially purified composition comprising trichlorosilane; c) a third column having a side inlet port fluidly connected to the side outlet port of the second column to receive the second partially purified composition, a top outlet port to remove a third top boron-containing contaminant stream, a bottom outlet port to remove a third bottom boron-containing contaminant stream, and a side outlet port to remove a third partially purified composition comprising trichlorosilane; d) a treatment vessel comprising at least one metal oxide having an inlet fluidly connected to the side outlet port of the third column to receive the third partially purified composition and an outlet to remove a treated composition; and e) a fourth column having a side inlet port fluidly connected to the outlet port of the treatment vessel to receive the treated composition, a top outlet port to remove a fourth top boron-containing contaminant stream, a bottom outlet port to remove a fourth bottom boron-containing contaminant stream, and a side outlet port to remove the purified product. Preferably, for this specific embodiment, the side outlet port of the second column is above the side inlet port of the second column, the side outlet port of the third column is below the side inlet port of the third column, and the side outlet port of the fourth column is above the side inlet port of the fourth column.

It is to be understood that both the foregoing general description and the following detailed description are exemplary and explanatory only and are intended to provide further explanation of the present invention, as claimed.

DETAILED DESCRIPTION OF THE INVENTION

Figure 1:
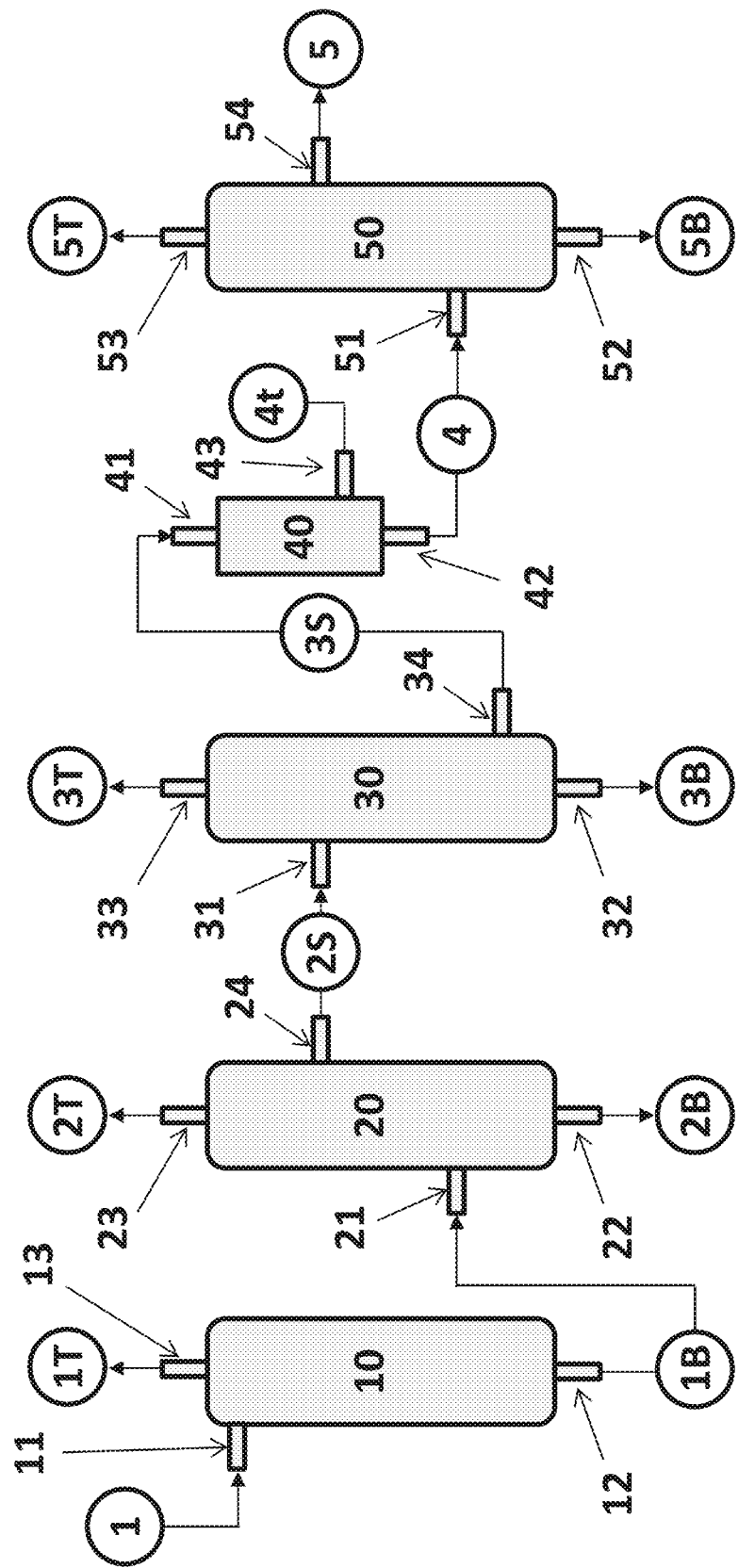
FIG. 1 and FIG. 2 are schematic views of systems for removing at least one boron-containing contaminant from a composition comprising trichlorosilane, in accordance with certain embodiments of the invention.

The present invention relates to systems and methods for removing contaminants from trichlorosilane-containing compositions.

Throughout the present specification, where the systems, processes, or methods are described as having, including, or comprising specific components, or where the processes or methods are described as having, including, or comprising specific steps, it is to be understood that, additionally, there are systems, processes, and methods of the present invention that consist essentially of, or consist of, the recited components, and that there are processes and methods of the present invention that consist essentially of, or consist of, the recited steps.

In various embodiments, the method of the present invention relates to a method of removing at least one boron-containing contaminant from a composition comprising trichlorosilane, thereby producing a purified product composition comprising trichlorosilane (TCS) containing extremely low levels of boron impurities. The composition can be prepared by any method known in the art, including, for example, by a hydrochlorination reaction of silicon tetrachloride, silicon, and hydrogen, or by direct chlorination in which silicon reacts with HCl. By these methods, typically the composition contains from about 12%-85% TCS, and therefore the composition does not necessarily comprise a majority (i.e. greater than 50% by weight) TCS. Without wishing to be bound by theory, it was previously believed in the art that TCS produced in a fluidized bed reactor contains $BCl_3$ as the primary boron-containing contaminant, and efforts to remove boron-containing species from TCS have typically focused on purification devices and methods for removing this compound. However, the present inventors, through considerable thermodynamic modeling studies, have determined that trichlorosilane produced in a hydrochlorination fluidized bed reactor contains a significant amount (i.e., nearly 50%) of additional boron species, especially $BHCl_2$ and that trichlorosilane produced in a direct chlorination fluidized bed reactor also contains a large amount of diborane ($B_2H_6$). Furthermore, it has been determined that these species disproportionate in reversible reactions yielding unstable species that are both higher boiling and lower boiling than TCS, making the removal of these compounds by standard techniques complicated and difficult. Therefore, a new design and technique is needed to effectively and efficiently remove all of these expected boron-containing species, and the present invention addresses this need and provides such a method and system.

In one embodiment, the method of the present invention comprises the step of forming a partially purified composition comprising trichlorosilane by at least partially removing the boron-containing contaminant from the composition. The method further comprises the step of feeding the partially purified composition into a purification column, such as a distillation column, having a side inlet port and a side outlet port. The partially purified composition is fed into the side inlet port of the purification column, and the resulting purified composition, comprising trichlorosilane, is removed from the side outlet port. This is sometimes referred to as a side-draw column. In addition, a boron-containing contaminant stream is removed from the top of the column, which contains impurities having a lower boiling point than TCS, and another boron-containing contaminant stream is removed from the bottom of the column, which contains impurities having a higher boiling point than TCS. The use of a side-draw column permits the removal of a mixture of boron-containing contaminants that were not previously expected to have been present in trichlorosilane. Depending on the level of boron found in the resulting purified composition, this may be further processed to remove additional species, including boron-containing impurities, such as by passing the purified composition through at least one additional purification device, to form the desired purified product. Alternative, if a target level of boron has been attained, the purified composition may be used as is, and, as such, would be considered to be the desired final purified product comprising trichlorosilane.

For this embodiment, additional benefits can be expected by varying the location of the side outlet port relative to the side inlet port of the purification column. For example, the side outlet port can be above (i.e., located at a position higher up the side of the column than) the side inlet port. This configuration would provide additional separation and removal of those boron-containing contaminants having a higher boiling point than TCS. In addition, depending on the specific location of the ports, other impurities, such as silicon tetrachloride (STC), which has a higher boiling point the TCS, can also be removed. Alternatively, the side outlet port can be at a position below the side inlet port of the purification, which would provide additional separation of boron-containing impurities having a lower point than TCS.

Furthermore, purification columns having the same or different inlet and outlet port locations can be used in series in order to provide improved removal of the boron-containing contaminants. For example, in this embodiment of the method of the present invention, the step of partially removing the boron-containing contaminant from the composition may comprise feeding the composition into a first purification column having a side inlet port and a side outlet port (i.e. a first side-draw column), wherein the composition is fed into the side inlet port and a first partially purified composition comprising trichlorosilane is removed from the side outlet port. Boron-containing contaminant streams can be removed from top and bottom outlet ports of this first purification column. The resulting first partially purified composition can subsequently be fed into a side inlet port of a second purification column (i.e. a second side-draw column), and, from a side outlet port of this column, a second partially purified composition comprising TCS can be removed, along with additional boron-containing contaminant streams being removed from top and bottom outlet ports of this column. The outlet port of the first purification column can be above the inlet port of the first purification column, and the outlet port of the second purification column can be below the inlet port of the second purification column, or vice versa. In this configuration, higher boiling and lower boiling boron-containing impurities, along with other impurities, can be readily removed.

In another embodiment, the method of the present invention comprises the step of feeding the composition comprising trichlorosilane and at least one boron-containing contaminant into a column having an upper inlet port and a top and bottom outlet port. The upper inlet port can be at the top of the column, such as beside the top outlet port, or may be positioned along the side of the column near the top (for example, along the side but not below the fifth plate of the column). Preferably the upper inlet port is above the first or second plate of the column. The composition is fed into the upper inlet port, a boron-containing contaminant stream is removed through the top outlet, and a partially purified composition comprising trichlorosilane is removed from the bottom outlet. As such, this purification column is first, and additional purification devices may subsequently follow, depending on the level of boron reduction attained. In this way, boron-containing impurities that boil lower than TCS can be readily removed or stripped from the TCS containing composition and, as such, this column is sometimes referred to as a stripper column. Furthermore, such a column would be useful for removing, to the extent possible, $BHCl_2$ and $B_2H_6$ prior to their disproportionation into higher boranes, such a pentaboran and decaborane. Thus, such a column would not have previously been expected to be useful for removing boron-containing species from TCS since it was not previously believed that these boron-containing contaminants would be present. Furthermore, $BCl_3$, also present, would be difficult to remove efficiently with such a column since the boiling point of this material is similar to that of TCS.

In a preferred embodiment of the method of the present invention, the steps described for each of these embodiments can also be used in combination in order to provide additional improvements for removal of boron species. For example, the composition comprising trichlorosilane and at least one boron-containing contaminant can be fed into a first purification column having an upper inlet port, a top outlet port, and a bottom outlet port. A first boron-containing contaminant stream can be removed from the top outlet port and a first partially purified composition comprising TCS can be removed from the bottom outlet port. This first partially purified composition can subsequently be fed into a side inlet port of a second column, which further has a top outlet port, a bottom outlet port, and a side outlet port. A second bottom boron-containing contaminant stream can be removed from the bottom port while a second top boron-containing contaminant stream can be removed from the top port. A second partially purified composition comprising TCS can be removed from the side outlet port. Furthermore, as described in more detail above, the side outlet port of the second column can be above or below the side inlet port of the second column, depending on whether it is desired to primarily remove boron species that boil higher than or lower than trichlorosilane. Also, additional purification devices, such as additional purification columns having side inlet ports and side outlet ports, can also be used to further purify the second partially purified composition. Other combinations could be determined by one of ordinary skill in the art, given the benefit of the present disclosure. Thus, combining the methods of both embodiments of the present invention in various and specifically chosen ways provides for thorough removal of boron species from trichlorosilane along with flexibility in plant design.

For both embodiments of the method of the present invention, any of the resulting partially purified compositions comprising trichlorosilane may be passed through at least one additional purification device in order to more effectively remove boron-containing impurities, as well as other contaminants also expected to be present. For example, the additional purification device may be a treatment vessel comprising, for example, a bed of adsorptive material such as a metal oxide. Preferably the metal oxide is silica gel. Thus, at least one of the partially purified compositions, removed from any of the columns described above, can be passed through a treatment vessel comprising an adsorptive bed of silica gel, and, in this way, additional removal of impurities can be obtained. For this example, preferably the partially purified composition comprising trichlorosilane is in the form of a gas and is passed over and through the adsorptive bed. If the partially purified composition is in the liquid phase, preferably the liquid is converted to a gaseous phase, such as by feeding the partially purified composition to a vaporizer. The temperature of the vaporizer can also be controlled in order to be able to further remove additional high or low boiling impurities and would therefore further comprise at least one port for removing these streams.

Also, since it would be expected that each of the boron-containing contaminant streams may also contain trichlorosilane, in order to improve the overall yield of the purification process, the method of the present invention may further comprise the step of recycling any of the boron-containing contaminant streams. For example, a contaminant stream may be fed back into any of the feeds of any of the partially purified compositions, or to the feed of the initial composition comprising TCS and at least one boron-containing contaminant, and, in this way, additional removal of trichlorosilane can result.

Embodiments of the present invention therefore provide a method for using a system of purification devices that can effectively and efficiently remove boron-containing contaminants from a TCS composition in order to produce a purified product comprising trichlorosilane. Thus, the present invention further relates to a system for removing at least one boron-containing contaminant from a composition comprising trichlorosilane to form the desired purified TCS product. The system comprises any of the purification devices described above relating to the various embodiments of the method of the present invention.

Figure 2:
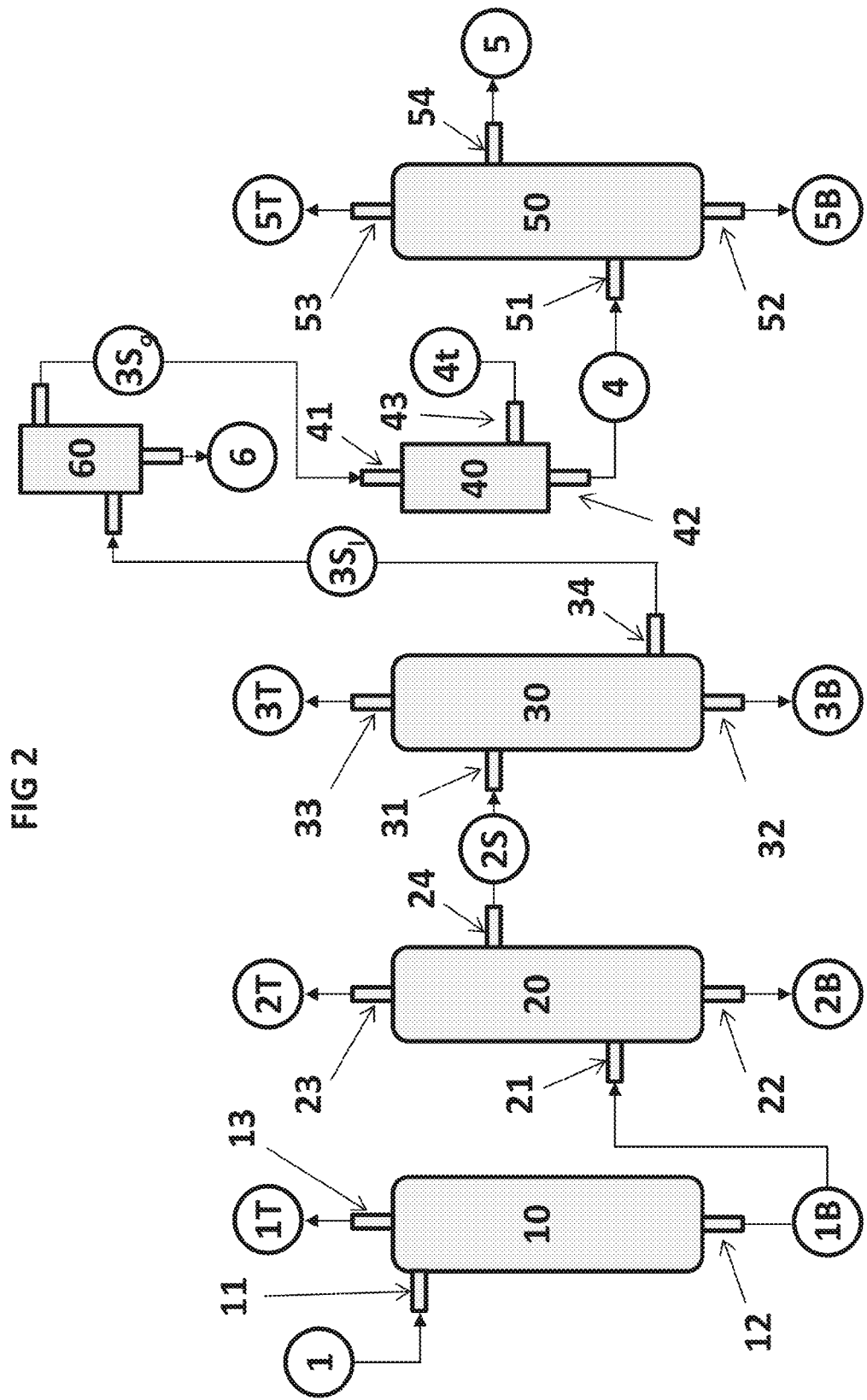

A specific embodiment of the system and method of the present invention for producing a purified composition comprising trichlorosilane from a composition comprising trichlorosilane and at least one boron-containing contaminant is shown in FIG. 1 and FIG. 2. It should be apparent to those skilled in the art that these are merely illustrative in nature and not limiting, being presented by way of example only. Numerous modifications and other embodiments are within the scope of one of ordinary skill in the art and are contemplated as falling within the scope of the present invention. In addition, those skilled in the art should appreciate that the specific configurations are exemplary and that actual configurations will depend on the specific system. Those skilled in the art will also be able to recognize and identify equivalents to the specific elements shown, using no more than routine experimentation.

In these exemplary embodiments, the systems of FIG. 1 and FIG. 2 include first column 10 having upper inlet port 11 (shown here on the side of column 10 near the top) to receive composition 1 comprising trichlorosilane and at least one boron-containing contaminant, bottom outlet port 12 to remove first partially purified composition 1B comprising TCS, and top outlet port 13 to remove first top boron-containing contaminant stream 1T. By feeding composition 1 through first column 10, contaminants that boil lower than TCS, including low boiling boron-containing contaminants can be stripped out.

The systems further include second column 20 having side inlet port 21 fluidly connected (i.e., allowing material to flow from one to the other) to side outlet port 12 of first column 10 to receive first partially purified composition 1B, bottom outlet port 22 to remove second bottom boron-containing contaminant stream 2B and top outlet port 23 to remove second top boron-containing contaminant stream 2T, and side outlet port 24 to remove second partially purified composition 2S comprising trichlorosilane. Configured in this way, second column 20 would remove both higher-boiling and lower-boiling contaminants compared to TCS. Furthermore, as shown, side outlet port 24 is above side inlet port 21 and would be particularly effective at removing contaminants that have a higher boiling point than trichlorosilane, and, in particular, silicon tetrachloride which is typically present in significant quantities in TCS prepared by hydrochlorination, along with various boron species expected to be present.

Side outlet port 24 of second column 20 is fluidly connected to side inlet port 31 of third column 30 to receive second partially purified composition 2S. Second column 30 further includes bottom outlet port 32 to remove third bottom boron-containing contaminant stream 3B, top outlet port 33 to remove third top boron-containing contaminant stream 3T, and side outlet port 34 to remove third partially purified composition 3S comprising trichlorosilane. As configured, third column 30 would also be capable of removing impurities that boil higher and lower than TCS. In addition, side outlet port 34 is shown to be below side inlet port 31, and, as such, third column 30 would be expected to be particularly effective at separating boron-containing contaminants having a lower boiling point than TCS from second partially purified composition 2S.

As shown in FIG. 1 and FIG. 2, side outlet port 34 of third column 30 is fluidly connected to inlet port 41 of treatment vessel 40, comprising at least one metal oxide, such as a bed of silica gel, to receive third partially purified composition 3S. Treatment vessel 40 further has outlet port 42 to remove treated composition 4, as well as an optional waste outlet 43 to remove treatment waste 4t. Generally, it is preferred to pass a gaseous form of partially purified composition 3S through treatment vessel 40 in order to maximize the efficiency of the adsorptive removal of contaminants. Therefore, as shown in FIG. 2, if third partially purified composition 3S is the form of a liquid ($3S_l$), side outlet port 34 is preferably connected to a device to convert it to a gaseous form ($3S_g$), such as vaporizer 60. This has the added benefit that, upon vaporization, additional higher boiling components 6 can also be removed.

The systems of these exemplary embodiments further include fourth column 50 having side inlet port 51 fluidly connected to outlet port 42 of treatment vessel 40 to receive treated composition 4 and side outlet port 54 to remove purified product 5. In addition, fourth column 50 has fourth bottom outlet port 52 to remove fourth bottom boron-containing contaminant stream 5B and fourth top outlet port 53 to remove fourth top boron-containing contaminant stream 5T. Similar to previous columns configured in the same way, fourth column 50 is also capable of removing impurities that boil higher and lower than TCS. Furthermore, as shown, side outlet port of 54 is above side inlet port 51, and, as such, would be expected to be particularly effective at separating high-boiling boron-containing contaminants from treated composition 4, thereby forming purified product 5.

The exemplary systems and methods of the present invention thus provide a series of specific types of purification columns and devices, each chosen to remove a specific type of boron-containing contaminant from a trichlorosilane composition which, prior to the present disclosure, were not understood or expected to be present. As such, it is expected that the resulting purified TCS product would have extremely low levels of boron species present, including, for example, less than or equal to about 0.5 ppb by weight boron, including less than or equal to about 0.3 ppb by weight boron and less than or equal to about 0.1 ppb by weight boron.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. For example, while it is preferred that, as shown in FIG. 1 and FIG. 2, first column 10 is fluidly connected to second column 20 and subsequently to third column 30, it is also possible for the order of the second and third columns to be reversed. Furthermore, treatment vessel 40 may, instead, be inserted prior to rather than after third column 30. The specific embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of removing at least one boron-containing contaminant from a composition comprising trichlorosilane to form a purified product comprising trichlorosilane, the method comprising the steps of:
   i) partially removing the boron-containing contaminant from the composition by feeding the composition into a first column through an upper inlet port proximal to a top end thereof, and removing from the first column
      a) a first top boron-containing contaminant stream through a top outlet port, and
      b) a partially purified composition comprising trichlorosilane through a bottom outlet port thereof, and
   ii) feeding the partially purified composition into a purification column through a side inlet port and removing from the purification column
      a) a top boron-containing contaminant stream through a top outlet port,
      b) a bottom boron-containing contaminant stream through a bottom outlet port, and
      c) a purified composition comprising trichlorosilane through a side outlet port.

2. The method of claim 1, wherein the side outlet port of the purification column is above the side inlet port of the purification column.

3. The method of claim 1, wherein the side outlet port of the purification column is below the side inlet port of the purification column.

4. The method of claim 1, wherein the purified composition is the purified product.

5. The method of claim 4, wherein the side outlet port of the purification column is above the side inlet port of the purification column.

6. The method of claim 1, wherein the method further comprises the step of passing the purified composition through at least one additional purification device to form the purified product.

7. The method of claim 6, wherein the additional purification device is a treatment vessel comprising at least one metal oxide.

8. The method of claim 7, wherein the treatment vessel comprises a bed of the metal oxide.

9. The method of claim 7, wherein the metal oxide is silica gel.

10. The method of claim 1, wherein the purified product has a boron content of less than or equal to about 0.5 ppb by weight boron.

11. The method of claim 1, where in the method further comprises at least one step of recycling at least one boron-containing contaminant stream.

* * * * *